United States Patent
Janssen

(10) Patent No.: US 6,851,731 B2
(45) Date of Patent: Feb. 8, 2005

(54) CRASH ENERGY ABSORBING ELEMENT

(75) Inventor: Aloysius Paulus Maria Helena Leonardus Janssen, Berg Aan de Maas (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/153,543

(22) Filed: May 22, 2002

(65) Prior Publication Data

US 2002/0180222 A1 Dec. 5, 2002

(30) Foreign Application Priority Data

May 29, 2001 (NL) .......................................... 01202024

(51) Int. Cl.[7] .............................................. B66R 19/56
(52) U.S. Cl. ........................ 293/102; 293/120; 293/122
(58) Field of Search ................................ 293/102, 120, 293/132, 133, 121, 122; 296/187.03, 187.09, 187.11; 188/371

(56) References Cited

U.S. PATENT DOCUMENTS

| | | | | |
|---|---|---|---|---|
| 5,080,410 A | * | 1/1992 | Stewart et al. ............... | 293/102 |
| 5,154,462 A | | 10/1992 | Carpenter .................... | 293/120 |
| 5,340,178 A | * | 8/1994 | Stewart et al. ............... | 293/132 |
| 5,772,267 A | * | 6/1998 | Heim et al. .................. | 293/132 |
| 5,997,058 A | | 12/1999 | Pedersen ...................... | 293/102 |
| 6,042,163 A | * | 3/2000 | Reiffer ........................ | 293/102 |
| 6,179,355 B1 | | 1/2001 | Chou et al. .................. | 293/132 |
| 6,217,089 B1 | * | 4/2001 | Goto et al. ................... | 293/102 |
| 6,318,775 B1 | * | 11/2001 | Heatherington et al. .... | 293/120 |
| 6,325,431 B1 | * | 12/2001 | Ito .............................. | 293/102 |
| 6,349,521 B1 | * | 2/2002 | McKeon et al. ............. | 293/102 |
| 6,360,441 B1 | * | 3/2002 | Himsl et al. ................. | 293/102 |
| 6,361,092 B1 | * | 3/2002 | Eagle et al. ................. | 293/102 |
| 6,540,276 B2 | * | 4/2003 | Azuchi et al. ............... | 293/102 |

FOREIGN PATENT DOCUMENTS

| | | |
|---|---|---|
| DE | 198 49 358 A1 | 5/2000 |
| DE | 199 58 887 A1 | 6/2000 |
| EP | 0 604 745 A1 | 7/1994 |

* cited by examiner

*Primary Examiner*—Lori L. Coletta
(74) *Attorney, Agent, or Firm*—Westman, Champlin & Kelly P.A.; S. Koehler

(57) ABSTRACT

A crash energy absorbing element for use in a vehicle has a box beam shape and comprises, in cross section, a high strength support section and a lower strength absorbing section. The high strength support section is adapted to be attached to the body of the vehicle, and the lower strength absorbing section is positioned so as to face away from the vehicle. The box beam shaped element can be made by hydroforming of a tube that is formed of a blank of at least two different sheet parts welded together which form the support section and the crash absorbing section.

18 Claims, 2 Drawing Sheets

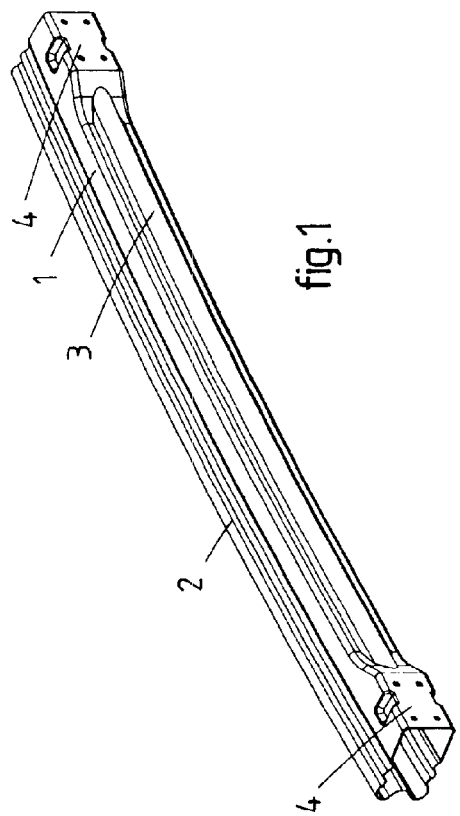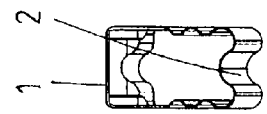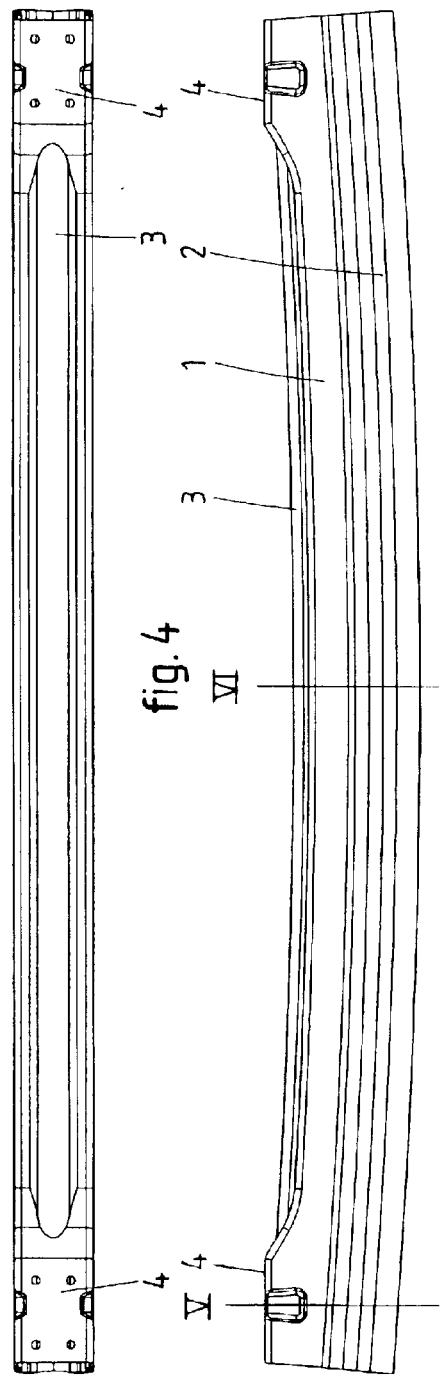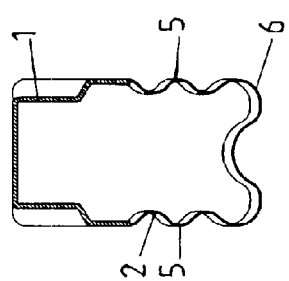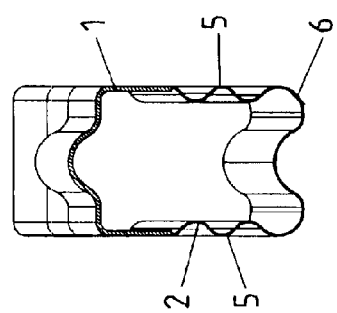

CRASH ENERGY ABSORBING ELEMENT

The present invention relates to a crash energy absorbing element for use in a vehicle, having a beam shape and being formed of at least two different beam sections.

One example of such crash energy absorbing elements is a bumper for a passenger car. Conventional bumpers are made of a box beam shaped or an open section of steel which is connected to the body of the car through crash boxes which are adapted to absorb the low speed crash energy A disadvantage of such crash boxes is that they are well designed to absorb frontal impact crashes, but are prone to buckling or bending during an angled frontal impact crash. Furthermore these separate crash boxes do lead to increased costs.

The object of the present invention is to provide an improved crash energy absorbing element.

SUMMARY OF THE INVENTION

The crash energy absorbing element according to the invention is characterized in that the absorbing element includes, in cross section, a high strength support section and a lower strength absorbing section, said high strength support section being adapted to be attached to the body of the vehicle, and said lower strength absorbing section being positioned so as to face away from the vehicle.

In this manner, the crash absorbing part of the element is moved from the rear of the element to the front portion of the element. This leads to a more rigid structure since the rear portion of the bumper remains intact for a longer time thereby maintaining the integrity of the structure. The absorbing and deforming section is now integrated in the element which lowers the production costs.

In an advantageous embodiment of the invention, the support section has integrated attachment members to attach the element to the vehicle. This leads to a lower number of parts and therefore lower production costs.

In case the crash energy absorbing element is constructed as a bumper, it is preferred that the attachment members are adapted to be mounted to the longitudinal members of the body.

In this embodiment, there is a direct rigid fixation of the bumper to the longitudinal members through the rigid support section of the bumper, thereby obviating the need for a separate body cross member. This not only reduces costs and weight, but also results in the possibility of a so-called "walk in front-end" assembly of the engine of the vehicle, which is moved into the engine compartment or bay through the open front of the vehicle body. After the engine has been mounted, the front bumper is attached to the body and the engine compartment is closed.

To increase the rigidity of the support section, it may include reinforcement swages, ribs and/or indentations, whereas the absorption behaviour and capacity is improved if the absorbing section includes integrated deformation formations, such as convolutions which initiate a controlled deformation of the absorbing section.

An advantageous manner to form the crash energy absorbing element is hydroforming, and preferably the box beam shaped element is made by hydroforming of a tube that is formed of a blank of at least two different sheet parts welded together which form the support section and the crash absorbing section.

In this production method, complex shapes of the element are possible and many parts can be integrated, which further reduces costs and weight.

The invention will hereafter further explained with reference to the drawings showing exemplary embodiments of the bumper according to the invention.

BRIEF DESCRIPTION OF THE DRAWINGS

FIG. 1 is a perspective view of a first embodiment of the crash energy absorbing element according to the invention.

FIGS. 2, 3 and 4 are plan, side and rear views, respectively, of the bumper according to FIG. 1, on a larger scale.

FIGS. 5 and 6 are sectional views along the lines, V—V and VI—VI, respectively in FIG. 2.

DETAILED DESCRIPTION OF THE ILLUSTRATIVE EMBODIMENTS

Figure 7:
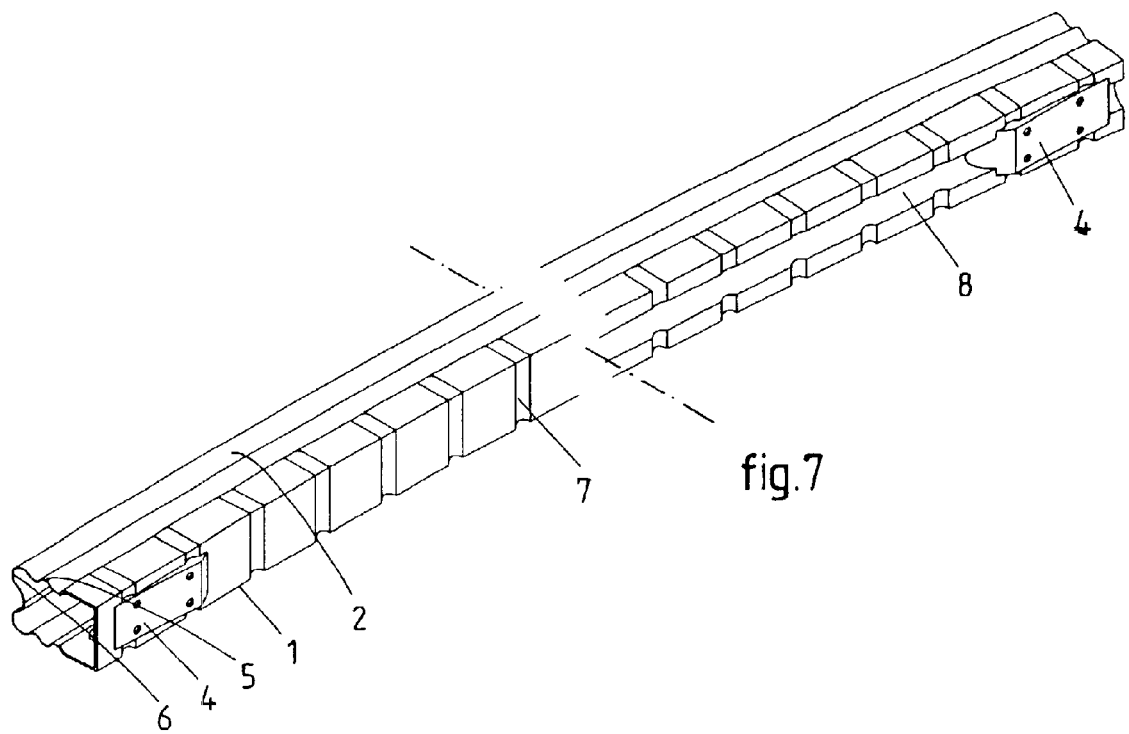
FIG. 7 is a perspective view, similar to that of FIG. 1, showing two further embodiments of the absorbing element according to the invention.

The drawings show embodiments of a crash energy absorbing element according to the invention, which in the exemplary embodiment is constructed as a front bumper for a passenger car. It should be understood that the invention may also be used in other elements, such as rear bumpers, and side crash energy absorbing elements for passenger cars and other vehicles.

As is shown in FIGS. 1–6, the bumper has a closed or box beam shape and is open at both ends. The bumper is bowed slightly and is formed of two sections, i.e. a rear high strength support section 1 and a front lower strength absorbing section 2. The support section 1 is the rigid portion and is made of a high strength material, such as (ultra) high strength steel, whereas the absorbing section 2 is made of a material, for example steel having a lower strength or yielding points respectively.

The object of the support section is to prevent bending and thereby prevent damage to panels and longitudinal members of the car at low speed collisions. Preferably this support section 1 has integrated reinforcement portions, such as swages, indentations and/or ribs 3 and mounting members or mounting surfaces 4 enabling the bumper to be attached to the longitudinal members of the car. Because of the direct attachment of the bumper to the longitudinal members and the rigidity of this support section 1, it is possible to leave out a separate cross body member.

The absorbing or deforming section 2 of the bumper has good energy absorbing properties due to the choice of material. The absorbing properties are further improved by formations initiating a controlled deformation when a force is applied. These integrated deformation formations can include convolutions 5 on the upper and lower sides of the bumper and/or convolutions 6 on the front side.

The absorbing element or bumper can be optimized as to the functional properties and weight by varying the wall thickness of both sections 1 and 2 and the surface ratio of both sections, steel qualities and geometry. The support section 1 may occupy 30–50% of the cross section of the beam shaped element, but this figure may also vary along the length of the absorbing element, depending on the shape of both sections. A possible material for the support section 1 is hot rolled S500MC or alternatively DP (Dual Phase) Steels, S460MC, S420MC or cold rolled H400LA. The absorbing section 2 will be a lower strength steel with a higher n-value, for example DC04. For the sake of completeness it is noted that also aluminium sheet could be used.

A method for producing the crash energy absorbing element is hydroforming of a tube that is formed of a blank of at least two different sheet parts. These sheet parts are welded together, for example through plasma or laser welding and eventually form the support section 1 and the crash absorbing section 2 of the element when suitably bent or formed. The plastic foam element and skin of the car can be clipped over the bumper and positioned in the grooves or formations of the bumper.

FIG. 7 illustrates, left and right of a central line, two different embodiments of the absorbing element or bumper, and, in particular, two different support sections 1 thereof. Both embodiments show cross depressions 7 to prevent bending or stretching of the bumper, both after the hydroforming and during the crash. The embodiment on the right side of the central line also includes a longitudinal depression 8.

Figure 8:
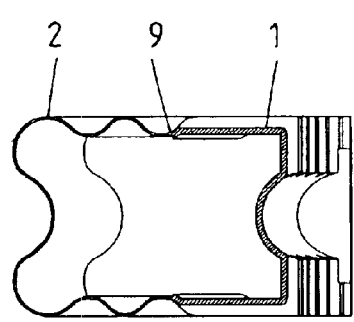
FIG. 8 is a cross sectional view of a further embodiment of the element according to the invention.

FIG. 8 shows a further embodiment in which the absorbing section 2 has been changed in shape. The sections 1 and 2 are connected such that the ends 9 of the absorbing section 2 are at an angle to the support section 1 and curve back such that the absorbing section 2 will deform inwardly during a collision.

Figure 9:
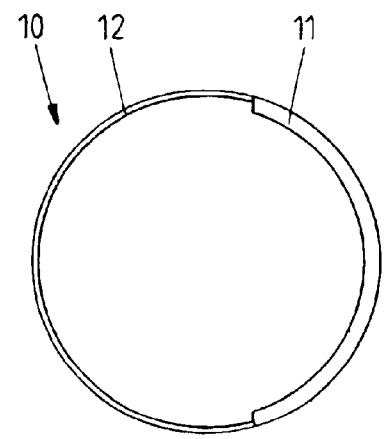
FIG. 9 is a cross sectional view of a tube from which the element of FIG. 8 is made.

FIG. 9 shows a tube 10 from which the absorbing element or bumper is made. Sheet 11 will form support section 1, whereas sheet part 12 will result in absorbing section 2. The sheet part 11 and thus the support section 1 preferably occupies 30–50% of the cross section of the tube 10 or bumper, respectively.

From the foregoing it will be clear that the invention provides a cross energy absorbing element which can be made with a low weight and at low costs, which has good crash energy absorbing properties leading to limited damage of the car body. It enables the attachment of a towing hook on the bumper and it makes a front body cross member redundant.

The invention is not restricted to the embodiments shown in the drawing and described hereinbefore, which may be varied in different ways within the scope of the accompanying claims. For example, it is possible to make up the beam of more than two sections, and the cross section of the starting tube may vary along the length thereof, regarding the distribution of the sections.

Although the present invention has been described with reference to preferred embodiments, workers skilled in the art will recognize that changes may be made in form and detail without departing from the spirit and scope of the invention.

What is claimed is:

1. A crash energy absorbing element for use on a body of a vehicle, said crash energy absorbing element having a box beam shape and including, in cross section, a high strength support section and a lower strength deforming section having a lower strength than the high strength support section, said high strength support section being adapted to be attached to the body of the vehicle, wherein only said lower strength deforming section, relative to said high strength support section, is positioned so as to face away from the vehicle when mounted thereto and wherein the high strength support section comprises material having a greater thickness than that of the lower strength deforming section.

2. The crash energy absorbing element according to claim 1, wherein the high strength support section has integrated mounting members to attach the crash energy absorbing element to the vehicle.

3. The crash energy absorbing element according to claim 2, constructed as a bumper, wherein the mounting members are adapted to be mounted to longitudinal members of the body of the vehicle.

4. The crash energy absorbing element according to claim 1, wherein the high strength support section includes reinforcement portions.

5. The crash energy absorbing element according to claim 1, wherein the lower strength deforming section includes integrated deformation formations.

6. The crash energy absorbing element according to claim 1, wherein the high strength support section is made of a stronger material than the lower strength deforming section.

7. The crash energy absorbing element according to claim 1, wherein the high strength support section is made of a stronger material than the lower strength deforming section.

8. The crash energy absorbing element according to claim 1, wherein the high strength support section occupies 30–50% of the cross section of the box beam shaped crash energy absorbing element.

9. The crash energy absorbing element according to claim 1, wherein the crash energy absorbing element is a bumper for a car, in particular a passenger car.

10. A crash energy absorbing element for use on a body of a vehicle, said crash energy absorbing element having a box beam shape and including, in cross section, a high strength support section and a lower strength deforming section having a lower strength than the high strength support section, said high strength support section being adapted to be attached to the body of the vehicle, wherein only said lower strength deforming section, relative to said high strength support section, is positioned so as to face away from the vehicle when mounted thereto and wherein the box beam shaped crash energy absorbing element is formed of a bendable blank of at least two different sheet parts welded together which form the high strength support section and the lower strength deforming section.

11. A crash energy absorbing element for use on a body of a vehicle, said crash energy absorbing element having a box beam shape and including, in cross section, a high strength support section and a lower strength deforming section having a lower strength than the high strength support section, said high strength support section being adapted to be attached to the body of the vehicle, wherein only said lower strength deforming section, relative to said high strength support section, is positioned so as to face away from the vehicle when mounted thereto and wherein the high strength support section is made of High Strength Steel and the lower strength deforming section is made of High Strength Steel having lower strength than the high strength support section.

12. A crash energy absorbing element for use on a body of a vehicle, said crash energy absorbing element having a box beam shape and comprises, in cross section:

a high strength support section including integrated mounting members adapted to be attached to the body of the vehicle, and a lower strength deforming section having a lower strength than the high strength support section and including integrated deformation formations, the lower strength deforming section being positioned substantially opposite to the mounting members so as to face away from the vehicle when mounted thereto, wherein a bendable blank of at least two different sheet parts welded together form the high strength support section and the lower strength deforming section.

13. The crash energy absorbing element according to claim 12, constructed as a bumper, wherein the mounting members are adapted to be mounted to the longitudinal members of the body of the vehicle.

14. The crash energy absorbing element according to claim 12, wherein the high strength support section includes reinforcement portions.

15. The crash energy absorbing element according to claim 12, wherein the deformation formations comprise convolutions.

16. A crash energy absorbing element for use on a body of a vehicle, said crash energy absorbing element having a box beam shape, wherein the box beam shaped crash energy absorbing element is made by hydroforming of a tube that is formed of a blank of at least two different sheet parts welded together which form, in cross section of the crash energy absorbing element:

a non-planar high strength support section including mounting members adapted to be attached to the body of the vehicle, and a lower strength deforming section having a lower strength than the high strength support section, wherein only the lower strength deforming section, relative to the high strength support section, is positioned substantially opposite to the mounting members so as to face away from the vehicle when mounted thereto.

17. The crash energy absorbing element according to claim 1 wherein the box beam shaped crash energy absorbing element is formed of a bendable blank of at least two different sheet parts welded together which form the high strength support section and the lower strength deforming section.

18. The crash energy absorbing element according to claim 1 wherein the high strength support section is made of High Strength Steel and the lower strength deforming section is made of High Strength Steel having lower strength than the high strength support section.

* * * * *